United States Patent
Tietze et al.

(10) Patent No.: US 8,206,112 B2
(45) Date of Patent: Jun. 26, 2012

(54) COOLING SYSTEM FOR A WIND TURBINE

(75) Inventors: Poul T. Tietze, Brabrand (DK); Jesper Nyvad, Egå (DK); Anand Bahuguni, Singapore (SG); Ravi Kandasamy, Singapore (SG); Krishnamoorthi Sivalingam, Singapore (SG)

(73) Assignee: Vestas Wind Systems A/S, Aarhus N (DK)

( * ) Notice: Subject to any disclaimer, the term of this patent is extended or adjusted under 35 U.S.C. 154(b) by 0 days.

(21) Appl. No.: 12/914,554

(22) Filed: Oct. 28, 2010

(65) Prior Publication Data

US 2011/0095539 A1    Apr. 28, 2011

Related U.S. Application Data

(60) Provisional application No. 61/255,688, filed on Oct. 28, 2009.

(30) Foreign Application Priority Data

Oct. 28, 2009 (DK) ................................ 2009 70177

(51) Int. Cl.
*F01D 5/08* (2006.01)
(52) U.S. Cl. ........................................ 416/175; 415/180
(58) Field of Classification Search ............... 415/1, 4.3, 415/115, 175, 177, 180, 905
See application file for complete search history.

(56) References Cited

U.S. PATENT DOCUMENTS

| | | | |
|---|---|---|---|
| 7,168,251 B1 * | 1/2007 | Janssen | 60/641.1 |
| 7,383,795 B2 * | 6/2008 | Lawrence et al. | 123/41.54 |
| 7,510,662 B1 | 3/2009 | Hansen | |
| 7,832,980 B2 * | 11/2010 | Demtroder et al. | 415/118 |
| 2004/0069252 A1 | 4/2004 | Olson | |
| 2007/0277593 A1 | 12/2007 | Salem et al. | |
| 2008/0290662 A1 | 11/2008 | Matesanz Gil et al. | |
| 2008/0307817 A1 * | 12/2008 | Roesner et al. | 62/259.2 |
| 2009/0200114 A1 * | 8/2009 | Bagepalli et al. | 184/6.22 |
| 2009/0229291 A1 | 9/2009 | Winn | |
| 2010/0034653 A1 * | 2/2010 | Frokjaer | 416/39 |

FOREIGN PATENT DOCUMENTS

DE    10352023 A1    6/2005

(Continued)

OTHER PUBLICATIONS

Danish Patent and Trademark Office, Office Action and Search Report issued in related Danish Patent Application No. PA 2009 70177 dated Jun. 11, 2010.

(Continued)

*Primary Examiner* — Edward Look
*Assistant Examiner* — Andrew C Knopp
(74) *Attorney, Agent, or Firm* — Wood, Herron & Evans, L.L.P.

(57) ABSTRACT

A wind turbine having a cooling system, which wind turbine includes a nacelle in connection with which one or more wind turbine components are arranged, is disclosed. The cooling system includes at least one cooling circuit arranged to lead a heat transfer medium to and from one or more of the wind turbine components, at least one cooling device arranged to cool the heat transfer medium, at least one pump arranged in connection with the at least one cooling circuit to circulate the heat transfer medium in the cooling circuit, and at least one medium tank arranged in connection with the cooling circuit. The at least one medium tank is arranged inside the nacelle.

14 Claims, 3 Drawing Sheets

FOREIGN PATENT DOCUMENTS

| | | |
|---|---|---|
| EP | 2088316 A2 | 8/2009 |
| WO | 0068570 A1 | 11/2000 |
| WO | 0177526 A1 | 10/2001 |
| WO | 2008092449 A2 | 8/2008 |
| WO | 2008131766 A2 | 11/2008 |
| WO | 2009080043 A2 | 7/2009 |

OTHER PUBLICATIONS

European Patent Office; Notification of Transmittal of the International Search Report and the Written Opinion of the International Searching Authority, or the Declaration; May 3, 2011, PCT/EP2010/066359, 11 pgs.

* cited by examiner

COOLING SYSTEM FOR A WIND TURBINE

CROSS REFERENCE TO RELATED APPLICATIONS

This application claims priority under 35 U.S.C. §119(a) to DK Application No. PA 2009 70177, filed Oct. 28, 2009. This application also claims the benefit of U.S. Provisional Application No. 61/255,688, filed Oct. 28, 2009. Each of these disclosures is incorporated by reference herein in its entirety.

TECHNICAL FIELD

The present invention relates to a wind turbine and, more particularly, to a wind turbine having a cooling system.

BACKGROUND

A wind turbine converts wind power into electrical energy by means of a generator placed among other wind turbine components in the nacelle. When the generator converts wind power into energy, the walls and the air surrounding the components are heated and the components themselves are thus heated, too.

When the components are heated, the efficiency with which the conversion takes place is substantially decreased. In order to cool the components, the walls and the air surrounding the components are cooled down by means of a heat sink positioned on top of the nacelle. Thus, the cool outside air passes through the heat sink and cools a circulating cooling medium within the heat sink, which is then used to cool the walls and/or the air surrounding the components and, in some instances, the interior of the components by circulating either cooled air or cooling medium within the components.

In known cooling systems for wind turbines, a cooling medium tank is arranged on top of the heat sink, causing issues concerning both handling and security for personnel performing maintenance on the cooling system. The same issues apply when the cooling system has to be ventilated for excess gasses or refilled with additional cooling medium.

SUMMARY

Embodiments of the present invention to wholly or partly overcome the above disadvantages and drawbacks of the prior art and provide an improved cooling system which makes handling and maintenance of the medium tank easier and safer than in prior art solutions.

Embodiments of the present invention also provide a cooling system which is more efficient than prior art cooling systems.

The above aspects, together with numerous other aspects, advantages, and features, which will become evident from the below description, are accomplished by a solution in accordance with embodiments of the present invention, by a wind turbine having a cooling system, which wind turbine comprises a nacelle in connection with which one or more wind turbine components are arranged, the cooling system comprising:

at least one cooling circuit arranged to lead a heat transfer medium to and from one or more of the wind turbine components, at least one cooling device arranged to cool the heat transfer medium, at least one pump arranged in connection with the at least one cooling circuit to circulate the heat transfer medium in the cooling circuit, and at least one medium tank arranged in connection with the cooling circuit, wherein the at least one medium tank is arranged inside the nacelle.

In accordance with embodiments of the present invention, the medium tank is placed inside the nacelle. When the pump is activated, the heat transfer medium is pumped into the cooling system, pushing air present in the system down into the tank. In addition, placing the medium tank inside the nacelle makes handling and maintenance of the tank easier and safer than in prior art solutions.

The medium tank is adapted to contain the amount of heat transfer medium necessary to fill the entire cooling system. Also, in accordance with embodiments of the present invention, the heat transfer medium may be filled into the medium tank before transportation and installation of the wind turbine.

In a further embodiment, the medium tank may be divided into at least a first compartment and a second compartment having at least one passage between them. The first compartment may comprise an inlet and an outlet to the cooling circuit, and the at least one passage between the two compartments are positioned below a level of the heat transfer medium in the medium tank.

Thus, the surface of the heat transfer medium present in the medium tank is kept calm, facilitating relief of the gasses present in the heat transfer medium.

Furthermore, the inlet and the outlet may taper from the medium tank towards the cooling circuit decreasing the flow of the heat transfer medium when entering the medium tank and increasing it when leaving the medium tank. When the flow is decreased in the first compartment, some of the heat transfer medium will flow up into the second compartment where it is ventilated before entering the first compartment and, accordingly, the cooling circuit again.

Additionally, guides and/or obstructions may be arranged inside the first compartment to decrease a flow of the heat transfer medium when entering the first compartment and to guide the heat transfer medium up into second compartment through the at least one passage.

Also, a first passage between the first compartment and the second compartment may be arranged in the vicinity of the inlet and a second passage between the first compartment and the second compartment may be arranged in the vicinity of the outlet. Thus, a flow passage to and from the second compartment is provided, allowing some of the heat transfer medium to be led up into the second compartment at the inlet. Thus, it is ventilated in the calm area of the second compartment before being led down through the second passage near the outlet of the first compartment.

Moreover, the passage between the first compartment and the second compartment may be H-shaped, facilitating relief of excess gasses and ventilation of the heat transfer medium along the H-shaped passage.

Furthermore, an additional inlet to the cooling circuit may be arranged in connection with the second compartment of the medium tank, and a restriction may be arranged in connection with the additional inlet. A self-adjusting cooling system is thus obtained, able to empty itself of heat transfer medium and lead it into the medium tank via the additional inlet when the pump is stopped. A further advantage is that the lifetime of different parts of the cooling circuit is extended, since they will not be exposed to high or low peak loads.

The medium tank may comprise ventilation means for ventilating the cooling system to rid the system of excess gasses.

Moreover, an inlet and an outlet to the cooling circuit may be arranged at a lower part of the medium tank.

The medium tank contains an amount of heat transfer medium large enough to secure that enough medium is present in the tank to keep the inlet and outlet below surface level even when the entire cooling system is filled with the heat transfer medium.

If the medium tank comprises ventilation means, these may be arranged in a top part of the medium tank. In one embodiment, the ventilation means may be a relief valve.

When the level of the medium present in the medium tank rises, the ventilation means can automatically release the excess gasses present in the medium tank to relieve the medium tank of excess pressure.

During operation of the cooling system, gasses, i.e., air present in the cooling system, is led towards the tank and is allowed to escape from the cooling circuit into the tank. The entire cooling system (with the exception of the upper part of the tank) is thus continuously emptied of excess gasses, making the cooling system more efficient than prior art systems.

In one embodiment, the medium tank may be made of blow moulded plastic. As blow moulded plastic has an inherent elasticity, it is able to absorb the pressure inside the medium tank. This is especially an advantage when the cooling system is a closed system, in which case the air volume above the surface level of the heat transfer medium inside the medium tank absorbs the relieved gasses.

In another embodiment, the medium tank may be made of metal.

The cooling device may be arranged outside the nacelle. Furthermore, the cooling device may project upwards from and substantially perpendicular to a top face of the nacelle, i.e., in a substantially vertical direction from a top face of the nacelle, and may in one embodiment be a free flow cooling device.

In this context, the term "free flow cooling device" is to be understood as a device where no power-driven equipment, such as a fan or the like, is used to lead the wind flow to the cooling device. Using a free flow cooling device makes the cooling system of the nacelle more reliable. Also, since the use of fans or the like is avoided, lower energy consumption is obtained and a reduction in noise has been observed, too. Since less equipment is arranged on the nacelle, the load on the nacelle has moreover been minimised.

A heater may be arranged in connection with the cooling circuit to heat the heat transfer medium. When it is possible to heat the heat transfer medium, the cooling system may be used to warm up the wind turbine components, e.g., when starting up the wind turbine.

Moreover, the heat transfer medium may be a liquid, such as water, glycol, oil, a mixture of these, or the like.

The invention also relates to a cooling system comprising a plurality of cooling systems as described above arranged within a single nacelle. Furthermore, one or more medium tank(s) may be connected to each cooling system.

A cooling device may be connected to each cooling system.

BRIEF DESCRIPTION OF THE DRAWINGS

The invention and its many advantages will be described in more detail below with reference to the accompanying schematic drawings which, for the purpose of illustration, show some non-limiting embodiments, and in which.

All the drawings are schematic and not necessarily to scale, and they show only those parts which are necessary in order to elucidate the invention, other parts being omitted or merely suggested.

DETAILED DESCRIPTION

A wind turbine nacelle 2 is situated on a tower and has a front facing a hub in which a plurality of rotor blades, normally three blades, is fastened. The wind turbine nacelle 2 houses a generator and other wind turbine components 3 used for driving the conversion process of wind energy to electricity—also called the drive train. When producing electricity, the drive train generates a lot of heat, resulting in a less effective conversion process. By wind turbine components are, inter alia meant the generator, the gear system, transformer(s), converter(s), pump(s), lubrication system(s), bearing(s), hydraulic system(s), and other heat generating components used during the conversion process inside or in the vicinity of the nacelle.

Aspects of the present invention may be used in connection with an upwind wind turbine, i.e., a wind turbine where the nacelle 2 is placed downwind from the wind turbine blades. However, the invention may as well advantageously be implemented in a downwind wind turbine, i.e., a wind turbine where the nacelle is placed upwind from the wind turbine blades.

Furthermore, aspects of the present invention may also be used in connection with a direct drive wind turbine.

Figure 1:
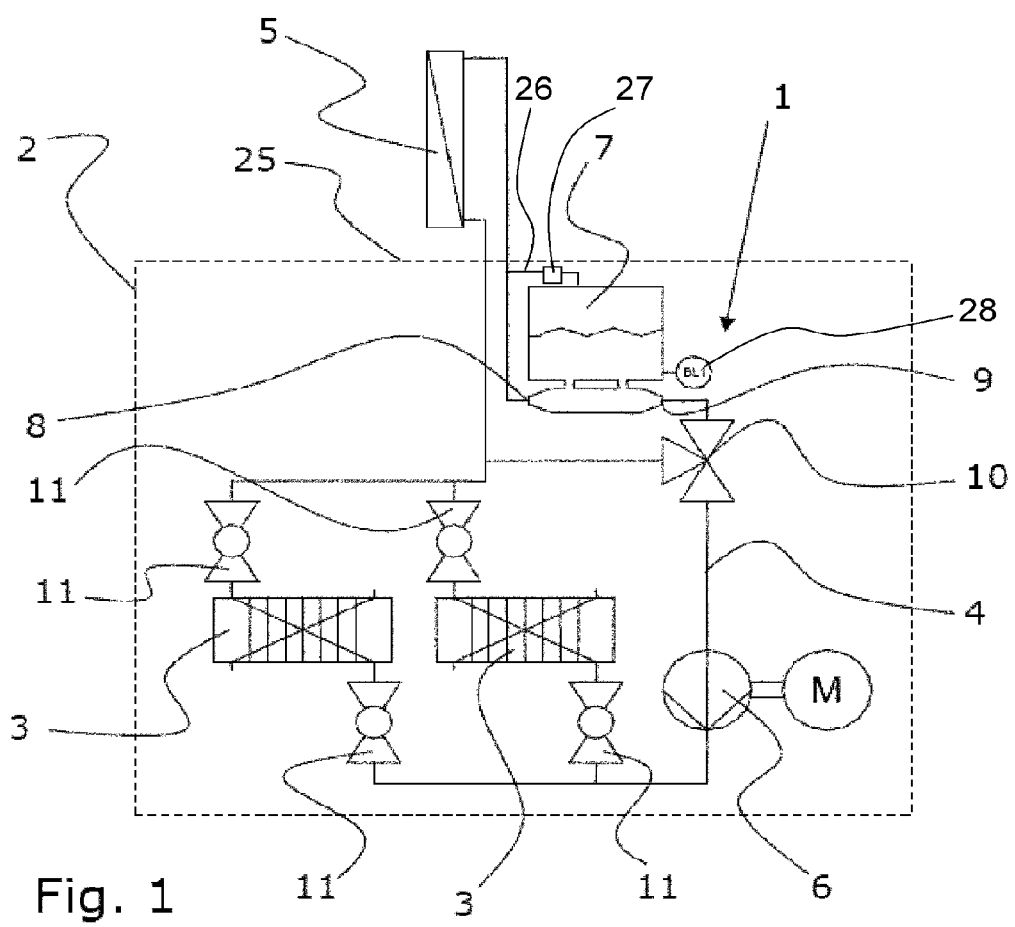
FIG. 1 shows a schematic diagram of the cooling system according to the invention.

FIG. 1 shows a schematic diagram of a cooling system 1 according to aspects of the present invention. The cooling system 1 is arranged inside a nacelle 2 (here depicted as a dotted line). In this embodiment, two wind turbine components 3 are arranged inside the nacelle 2. However, in other embodiments, one or more of the wind turbine components 3 may be arranged in connection with the nacelle 2, e.g., outside the nacelle (not shown).

The cooling system 1 comprises a cooling circuit 4 arranged to lead a heat transfer medium to and from one or more of the wind turbine components 3. Furthermore, a least one cooling device 5 is arranged to cool the heat transfer medium. The cooling device 5 is arranged outside the nacelle 2 and may advantageously be a free wind cooling device.

As can be seen, the cooling device 5 projects upwards and substantially perpendicular to a top face 25 of the nacelle 2. However, in another embodiment, the cooling device 5 may extend from the top face 25 of the nacelle in an angle different from 90° in order to provide a more optimal cooling.

In addition, at least one pump 6 is arranged in connection with the cooling circuit 4 to circulate the heat transfer medium in the cooling circuit 4. A medium tank 7 is arranged inside the nacelle 2 and is also connected with the cooling circuit 4.

The medium tank 7 has an inlet 8 and an outlet 9 connected to the cooling circuit 4. Near the outlet 9, a three-way valve 10 is arranged in the cooling circuit 4, making it possible to lead the heat transfer medium past the wind turbine components 3 to ensure that they are not influenced by the heat transfer medium.

Valves 11 are arranged at the inlet 8 and outlet 9 to the wind turbine components 3. These valves 11 may be controlled separately making it possible to adapt the flow of heat transfer medium into each wind turbine component 3 to the instantaneous requirement.

Figure 2:
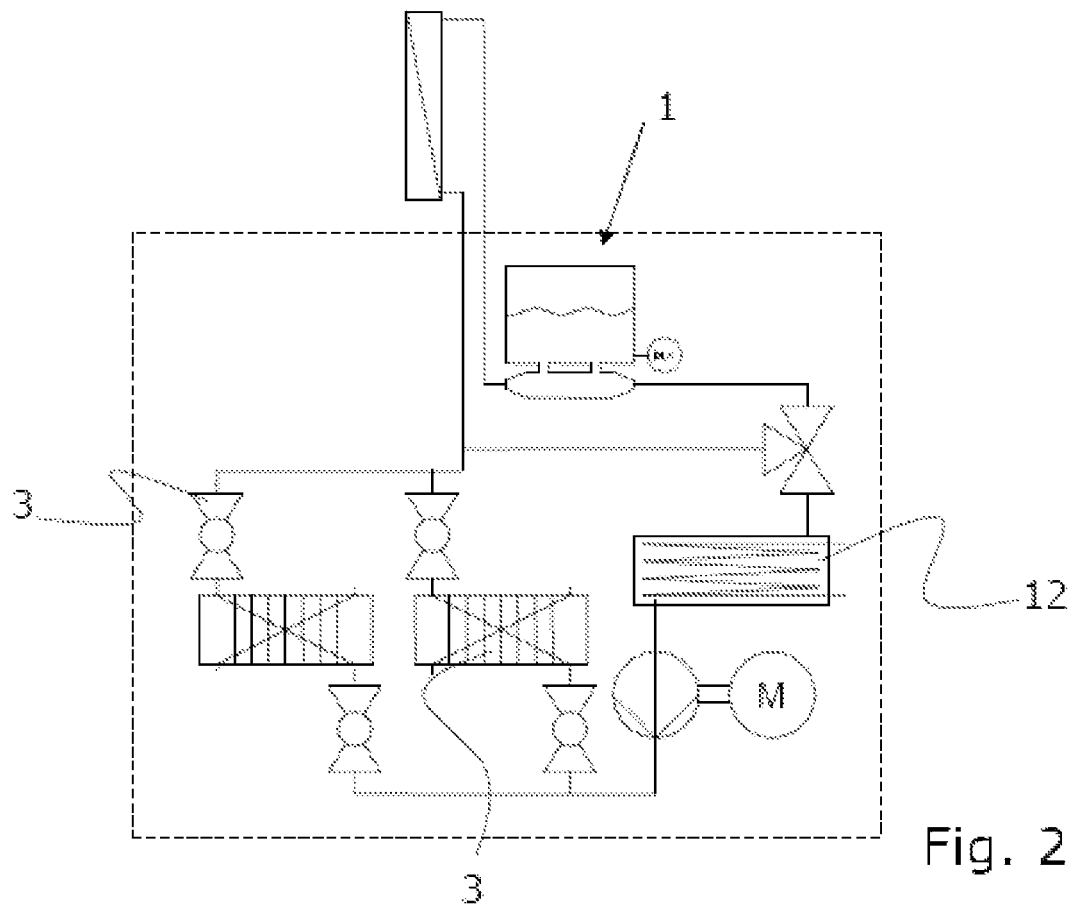
FIG. 2 shows the cooling system of FIG. 1 with a heating element.

In FIG. 2, the cooling system 1 furthermore comprises a heater 12 which may heat the heat transfer medium in circumstances where the cooling system 1 is to be used to heat rather than cool the wind turbine components 3, e.g., when starting up the wind turbine.

Figure 3:
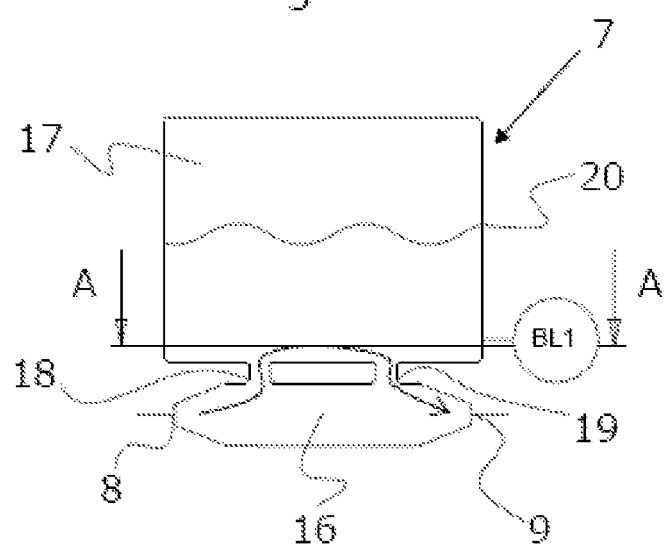
FIG. 3 shows an embodiment of the medium tank in cross-section.

In FIG. 3, the medium tank 7 is shown in cross-section. The inlet 8 and the outlet 9 are arranged in the lower part of the medium tank 7. In this embodiment, the medium tank 7 is divided into a first compartment 16 and a second compartment 17 with a first passage 18 and a second passage 19.

The first compartment 16 may comprise the inlet 8 and the outlet 9 and, in some circumstances, the second compartment 17 may comprise ventilation means (not shown). The passages 18, 19 between the two compartments 16, 17 may be positioned below a surface level 20 of the heat transfer medium present in the medium tank 7. Thus, the surface of the heat transfer medium present in the medium tank 7 may be kept calm, facilitating relief of the gasses present in heat transfer medium.

The inlet 8 and the outlet 9 taper from the medium tank 7 towards the cooling circuit 4, causing a drop of pressure near the inlet and thus a decrease in the flow of the heat transfer medium when its enters the first compartment 16. Again, this serves to keep the heat transfer medium present in the medium tank 7 calm, facilitating relief of the gasses present in heat transfer medium. Conversely, when the heat transfer medium leaves the first compartment 16, the fact that the outlet 9 tapers towards the cooling circuit 4 causes the flow to increase before the heat transfer medium enters into the cooling circuit. Also, the first passage 18 between the first compartment 16 and the second compartment 17 may be arranged in the vicinity of the inlet 8 and a second passage 19 between the first compartment 16 and the second compartment 17 may be arranged in the vicinity of the outlet 9. A flow passage to and from the second compartment 17 is thus provided, causing some of the heat transfer medium to be led up into the second compartment 17 at the inlet 8. The heat transfer medium is ventilated and relieved of excess gasses in the calm area of the second compartment 17, and is subsequently led down through the second passage 19 near the outlet 9 of the first compartment (indicated with the arrow), now containing less gasses than when entering the second compartment.

Additionally, guides and/or obstructions (not shown) may be arranged inside the first compartment 16, decreasing the flow of heat transfer medium on entry into the first compartment and guiding the heat transfer medium up into the second compartment 17 through the at least one passage.

Figure 4:
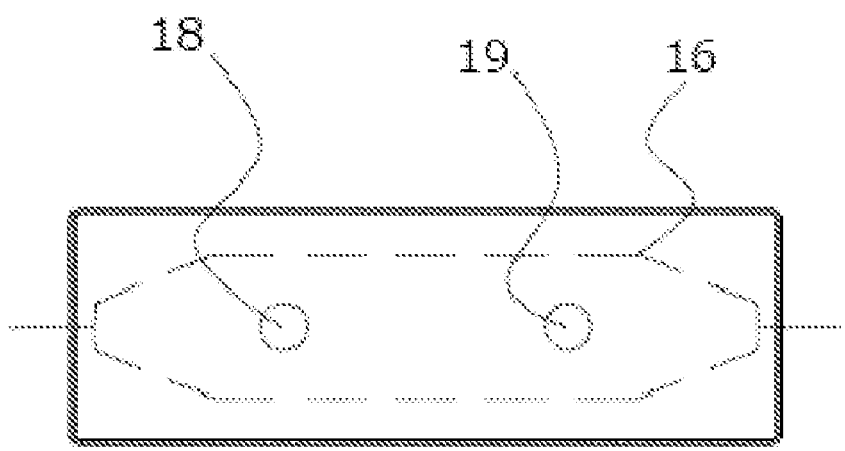
FIGS. 4 and 5 show different passages between the first and second compartments seen from the top.

In FIG. 4, the first passage 18 and the second passage 19 are shown along the cross-section indicated as A in FIG. 3. The first compartment 16 is indicated by the dotted line.

Figure 5:
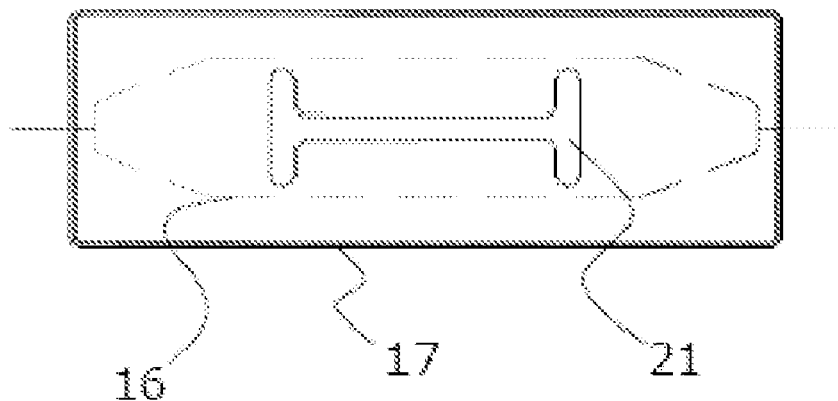

In FIG. 5, the passage 21 between the first compartment 16 and the second compartment 17 is H-shaped, facilitating relief of excess gasses and ventilation of the heat transfer medium along the H-shaped passage 21.

Furthermore, the medium tank 7 may be made of blow moulded plastic. As blow moulded plastic has an inherent elasticity, it is able to absorb the pressure inside the medium tank. This is especially an advantage when the cooling system is a closed system, in which case the air volume above the surface level 20 of the heat transfer medium inside the medium tank 7 absorbs the relieved gasses.

In another not shown embodiment, the medium tank 7 may have ventilation means arranged in a top part of the medium tank. The ventilation means may be a relief valve. When the level of the heat transfer medium present in the medium tank 7 rises, the ventilation means can automatically release the excess gasses present in the medium tank to relieve the medium tank of excess pressure.

The ventilation means may also be adapted to let gasses, i.e., air, into the medium tank 7 when the level of heat transfer medium present in the medium tank is lowered, thus avoiding a negative pressure inside the medium tank.

In another embodiment as shown in FIG. 1, the top of the medium tank 7 may be connected to the cooling circuit via a tube or hose 26. Furthermore, an on/off valve 27 or throttle valve may be arranged in connection with the tube 26. This arrangement may be used for emptying the cooling system of heat transfer medium and lead the heat transfer medium into the medium tank 7, for instance during maintenance or during failure of e.g. the pump. It is an advantage that the cooling system can be emptied rapidly and that the heat transfer medium can be stored in the medium tank 7 since leakage and spill of heat transfer medium outside the nacelle may in this way be avoided.

If a throttle valve is arranged in connection with the tube, it may also assist in keeping the heat transfer medium calm within the cooling system. This is particularly advantageous when the cooling system is a closed system.

Moreover, as shown in FIG. 1 a pressure sensor 28 may be arranged in connection with the medium tank 7. Preferably, the pressure sensor 28 is a differential pressure transmitter positioned at the bottom of the medium tank 7 and connected with the interior of the top part of the medium tank. The differential pressure transmitter is adapted to measure the pressure of the heat transfer medium present in the medium tank as well as the pressure in the medium tank 7 above the surface level of the heat transfer medium. In this way, the differential pressure transmitter shows the actual pressure and thereby the amount of heat transfer pressure present in the tank. This is due to the fact that it measures the differential pressure and takes any pressure changes into account. This is particularly advantageous when the cooling system is a closed system.

Furthermore, the wind turbine may comprise a plurality of cooling systems 1 according to aspects of the present inventive idea. Thus, separate wind turbine components 3, e.g., the gear system, may have their own separate cooling system. In these circumstances, at least one medium tank 7 may be connected to each cooling system 1, a plurality of medium tanks thus being arranged inside the nacelle. Additionally, one or more cooling devices 5 may each be connected to their separate cooling system 1.

Although the invention has been described in the above in connection with preferred embodiments of the invention, it will be evident for a person skilled in the art that several modifications are conceivable without departing from the invention as defined by the following claims.

What is claimed is:

1. A wind turbine having a cooling system, the wind turbine comprising a nacelle in connection with which one or more wind turbine components are arranged, the cooling system comprising:

at least one cooling circuit arranged to lead a heat transfer medium to and from one or more of the wind turbine components, a least one cooling device arranged to cool the heat transfer medium, at least one pump arranged in connection with the at least one cooling circuit to circulate the heat transfer medium in the cooling circuit, and at least one medium tank arranged in connection with the cooling circuit, wherein the at least one medium tank is arranged inside the nacelle and is divided into at least a first compartment and a second compartment having at least one passage between them, the first compartment being situated below the second compartment.

2. The wind turbine according to claim 1, wherein the first compartment comprises an inlet and an outlet to the cooling circuit, and the at least one passage between the two compartments is positioned below a level of the heat transfer medium in the medium tank.

3. The wind turbine according to claim 2, wherein the inlet and the outlet taper from the medium tank towards the cooling circuit.

4. The wind turbine according to claim 1, wherein guides or obstructions are arranged inside the first compartment to decrease a flow of the heat transfer medium when entering the first compartment and to guide the heat transfer medium up into the second compartment through the at least one passage.

5. The wind turbine according to claim 1, wherein a first passage between the first compartment and the second compartment is arranged in the vicinity of the inlet and a second passage between the first compartment and the second compartment is arranged in the vicinity of the outlet.

6. The wind turbine according to claim 1, wherein the passage between the first compartment and the second compartment is H-shaped.

7. The wind turbine according to claim 1, wherein an additional inlet to the cooling circuit is arranged in connection with the second compartment of the medium tank.

8. The wind turbine according to claim 7, wherein a valve is arranged in connection with the additional inlet.

9. The wind turbine according to claim 1, wherein the medium tank is made of blow moulded plastic.

10. The wind turbine according to claim 1, wherein the cooling device is arranged outside the nacelle.

11. The wind turbine according to claim 10, wherein the cooling device projects upwards from and substantially perpendicular to a top face of the nacelle.

12. The wind turbine according to claim 10, wherein the cooling device is a free flow cooling device.

13. A wind turbine comprising a plurality of cooling systems according to claim 1 arranged within a single nacelle.

14. The wind turbine according to claim 13, wherein a cooling device is connected to each cooling system.

* * * * *